United States Patent [19]
Renaud

[11] Patent Number: 4,498,565
[45] Date of Patent: Feb. 12, 1985

[54] CLUTCH RELEASE BEARING

[75] Inventor: Pierre Renaud, Le Plessis-Trevise, France

[73] Assignee: Valeo, Paris, France

[21] Appl. No.: 340,707

[22] Filed: Jan. 19, 1982

[30] Foreign Application Priority Data

Feb. 2, 1981 [FR] France .................... 81 01933

[51] Int. Cl.³ ............................................. F16D 23/14
[52] U.S. Cl. .................................... 192/98; 192/110 B
[58] Field of Search ............................ 192/98, 110 B;
384/189 A, 184 A

[56] References Cited

U.S. PATENT DOCUMENTS

| 3,333,664 | 8/1967 | Chapaitis | 192/98 |
| 3,877,557 | 4/1975 | Maucher | 192/98 |
| 3,882,979 | 5/1975 | Limbacher et al. | 192/98 |
| 3,913,714 | 10/1975 | Camp | 192/98 |
| 3,921,775 | 11/1975 | Matyschjk | 192/98 |
| 4,228,881 | 10/1980 | Nakamura | 192/98 |

FOREIGN PATENT DOCUMENTS

| 1372776 | 10/1962 | France . |
| 1451445 | 9/1966 | France . |
| 1522800 | 5/1967 | France . |
| 2007818 | 5/1969 | France . |
| 2186095 | 12/1973 | France . |
| 2334880 | 11/1976 | France . |
| 2340474 | 2/1977 | France . |
| 2169578 | 12/1977 | France . |
| 1104335 | 2/1968 | United Kingdom . |
| 1126058 | 9/1968 | United Kingdom . |
| 1231290 | 5/1971 | United Kingdom . |
| 1387284 | 3/1975 | United Kingdom . |
| 1412076 | 10/1975 | United Kingdom . |
| 1543444 | 4/1979 | United Kingdom . |

Primary Examiner—Rodney H. Bonck
Assistant Examiner—James J. Merek
Attorney, Agent, or Firm—Charles E. Brown

[57] ABSTRACT

The invention relates to a clutch release bearing assembly having an operating element which is acted upon by a control member such as a disengaging fork, a tubular actuator forming an extension-piece, which, under the action of the operating element is adapted to act on the disengagement mechanism of the clutch and a bearing element located between the operating element and the actuator and which is movable transversely in every direction relative to the operating element. According to the invention, the assembly is designed such that the bearing element is also movable transversely in every direction relative to the actuator.

15 Claims, 1 Drawing Figure

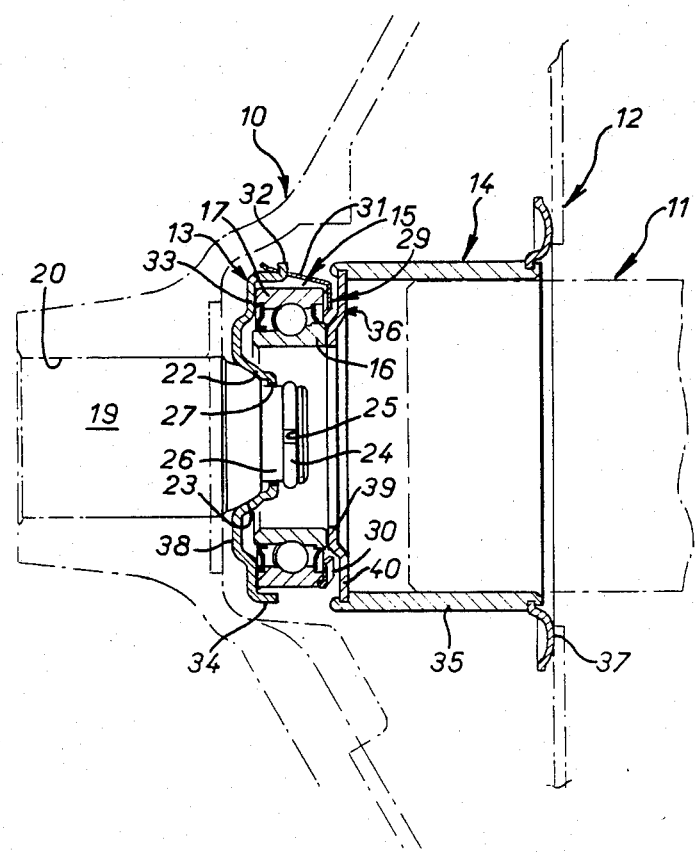

CLUTCH RELEASE BEARING

BACKGROUND OF THE INVENTION

This invention relates generally to clutch release bearings, notably for motor vehicles, and more particularly to the assembly incorporating a clutch release bearing in a motor vehicle.

More particularly, the invention relates to an assembly of this kind which makes use of an operating element, which is acted upon by a control member such as a disengaging fork, an actuator which, under the effect of the operating element, is adapted to act on the disengagement mechanism of a clutch, and a bearing element which is disposed between the operating element and the actuator.

Such an assembly is described, in particular, in a French patent application filed on Dec. 13, 1972 under No. 72 44298 and published under No. 2,169,578.

In this French patent application, the operating element forms a cowling which surrounds the outer ring of the bearing element without any radial play, and, similarly, the actuator comprises a tubular part which is fitted without any radial play into the inner ring of this bearing element.

In practice, even though this actuator is a separate component from the bearing element, technically it constitutes a simple axial extension of the inner ring thereof.

Since the bearing element is formed by ball bearings, this arrangement, which is well-known, has the advantage of enabling both radial and axial offsetting of the zone of action of these bearings and hence making it possible to use an economical bearing of reduced diameter and simple construction, without the inherent complications of such bearings.

Hitherto, clutch release bearing assemblies of this kind have not themselves had the property of self-centering which would enable them to correct any off-centering between the operating element and the actuator.

Such a movement off-centre might occur when the operating element is in engagement with a support member mounted so as to be axially movable, whilst the actuator in turn is mounted so as to slide axially over a support guide separate from the previous support member (this is not the case in the French patent application mentioned above).

It is also known, in so-called self-centering clutch release bearings, especially those with maintained self-centering, that two of the elements constituting such a bearing should be transversely movable in every direction relative to each other, one of these elements having, transversely with respect to the other, and omnidirectional capacity for movement.

This invention relates generally to the incorporation of an arrangement of this kind in a release bearing assembly of this kind comprising an operating element, an actuator and an intermediate bearing element, in order to extend the field of application of such an assembly.

SUMMARY

More precisely, the invention provides a clutch release bearing assembly, notably for a motor vehicle, of the kind having an operating element which is acted upon by a control member such as a disengaging fork, an actuator forming an extension-piece, which, under the action of the operating element, is adapted to act on the disengagement mechanism of a clutch, and a bearing element which, being located between the operating element and the actuator, is transversely movable in every direction relative to the operating element, this release bearing assembly being characterised in that the bearing element is also transversely movable in every direction relative to the actuator.

Thus, according to the invention, the bearing element is mounted so as to be transversely movable in every direction not only relative to the operating element but also relative to the actuator and therefore relative to two distinct elements, thus permitting the desired self-centering whilst retaining the advantages which result from using an actuator comprising an extension-piece, and providing a suitable support for the bearing element.

BRIEF DESCRIPTION OF THE DRAWING

The accompanying schematic drawing shows an axial section illustrating a clutch release bearing assembly according to the invention.

DESCRIPTION OF THE PREFERRED EMBODIMENT

The drawing partially shows, in broken lines, the cover 10 of a clutch, the hub 11 thereof and, at 12, a disengagement mechanism which constitutes the control means for the clutch.

The release bearing assembly provided according to the invention for acting on this disengagement mechanism 12, which may simply consist, in known manner, of the radial ends of the fingers of a diaphragm spring, comprises an operating element 13, which is acted upon by a control member, which in practice is a disengaging fork (not shown), an actuator 14 forming an extension-piece, which is tubular in the embodiment shown, and which under the action of the operating element 13, is adapted to act on the disengagement mechanism 12, and a bearing element 15 which is located between the operating element 13 and the actuator 14, and which comprises two coaxial rings 16, 17, one on the inside and one on the outside, mounted so as to be rotatable relative to each other.

In the embodiment shown, the operating element 13 comprises a support plate shaped as described hereinafter, which extends overall at right angles relative to the axis of the assembly and which engages with a support member 19 which is mounted so as to be axially movable, the support member 19 slidingly engaging, for guidance, in a bore 20 formed in the cover 10; the support plate is acted upon by the associated support member via the support member 19.

In practice, this support member 19 constitutes a simple spindle end to which the associated control member is connected upstream of the cover 10.

Preferably, according to the invention, in order to alleviate the consequences of any defect in parallelism between the axis of this support member 19 and that of the hub 11, swivel means are provided between the operating element 13 and the support member 19.

In the embodiment shown, these swivel means result from the fact that the support plate forming the operating element 13 is formed in its central zone with a spherical cup 22, by which it abuts axially on a shoulder 23 having a complementary spherical contour provided for this purpose on the end of the support member 19.

Since the assembly is a residual load assembly ensuring permanent axial biasing towards the disengagement mechanism 12, the spherical shoulder 23 of the support member 19, which is convex, has its convexity facing towards the disengagement mechanism 12, and the spherical cup 22 of the support plate forming the operating element 13 is shaped and oriented accordingly.

In the event of any defect in parallelism between the support member 19 and the hub 11, the swivel means thus formed ensure, by the tilting of the operating element 13 relative to the axis of its support member 19, that the bearing element 15 which abuts this operating element 13 will not cause the actuator 14 to seize up on the hub 11; in fact, these swivel means enable the operating element 13, and hence the bearing element 15, to stay in the axis of the hub 11, in every disposition.

In the embodiment shown, a flexible split ring 24 engaging in a groove 25 in an axial extension 26 of the support member 19 ensures, should it be necessary, that the operating element 13 is axially held in place, whilst the spherical cup 22 of the support plate forming the latter comprises a radial edging 27, in its central zone, in the direction of the above-mentioned axial extension 26 of the support member 19.

In the embodiment shown, the bearing element 15 consists of a ball bearing which, in this embodiment, is a standard ball bearing. By the edge of its outer ring 17 facing towards the operating element 13, the bearing element is axially in contact with the operating element, and similarly, by the edge of its inner ring 16 facing towards the actuator 14, the bearing element is axially in contact with the actuator.

Moreover, the bearing element 15 is axially connected to the operating element 13 and is thus carried by the latter, whilst being transversely movable in every direction relative to this operating element 13.

In the embodiment shown, the bearing element 15 is connected axially to the operating element 13 via a cowling 29, and the latter comprises, on the one hand, a front wall 30 which undulates in a circular pattern in the manner of the undulating washers sold commercially under the name "ONDUFLEX", by which it abuts on the edge of the outer ring 17 of the bearing element 15 opposite the operating element 13, and a plurality of lugs 31 which are distributed in a circular arrangement and by which it engages with hooks 32 provided for this purpose on the operating element 13, on the outer periphery of the support plate forming this operating element.

Thus, in the embodiment shown, the support plate forming the operating element 13 comprises, on the one hand, in its axial zone, the spherical cup 22 and, on the other hand, in its peripheral zone, for supporting the bearing element 15, a peripheral zone 33 defined peripherally by an edging 34 on which the hooks 32 are formed axially at intervals.

The support plate further comprises, between the said spherical cup 22 and the peripheral zone 33, a central zone 38 which is axially offset relative to the peripheral zone 33 in the opposite direction to the ball bearings which constitute the bearing element 15, and which is axially spaced from the inner ring 16 thereof, since the ball bearings are standard bearings.

In any case, the release bearing assembly according to the invention thus constitutes a self-centering release bearing with maintained self-centering, and the axially effective flexible washer forms the front wall 30 of the cowling 29 ensures that the bearing element 15 is held in place when this bearing element 15 is not subject to any other stress.

Obviously, the peripheral zone 33 of the operating element 13 has a sufficient radial development to permit the desired self-centering.

In the embodiment shown, the actuator 14 is mounted so as to slide axially on a support guide, formed in practice by the hub 11 of the clutch, and, since this is a residual load assembly and therefore abuts constantly, as explained hereinbefore, it simply abuts axially on the bearing element 15. There is thus no special axial connection between this bearing element 15 and the actuator 14.

As shown, the actuator 14 comprises an axial wall 35 by which it slidingly engages the hub 11 of the clutch, and, at opposite ends of this wall, radial flanges 36, 37 are provided, the first for cooperating with the bearing element 15 and the second for acting on the disengagement mechanism 12.

The radial flange 36 which is radially directed towards the axis of the assembly comprises two concentric zones axially offset relative to each other, one of them, 39, which is the radially inner or central zone, for cooperating with the bearing element 15 and the other, 40, which is the radially outer or peripheral zone, for connection with the axial wall 35.

This arrangement makes it possible to provide, in the axial direction at right angles to the peripheral zone 40, the space needed for the front wall 30 of the cowling 29.

However, as will be noted, the central zone 38 of the operating element 13 and that 39 of the flange 36 of the actuator 14 are axially offset in the same direction, and this advantageously reduces the axial dimensions of the assembly.

Similarly, the radial flange 37, which is radially directed away from the axis of the assembly, has a convex profile in the transverse direction, for acting on the disengagement mechanism 12.

These radial flanges 36 and 37 may be continuous with the axial wall 35 with which they are associated, having been formed integrally therewith.

However, as shown in the drawing, these radial flanges have different mechanical working conditions from the axial wall 35 and therefore they preferably form parts which are separate from this axial wall 35 and suitably mounted thereon.

This is true of the radial flange 37 which should have a sufficient degree of hardness, and it is also true of the radial flange 36, which should also have a certain hardness.

In the embodiment shown, the radial flanges 36, 37 are simply mounted by being set on the axial wall 35, at the ends thereof, whilst the ends are suitably bent round radially for this purpose.

In any case, according to the invention, the bearing element 15 is movable transversely in every direction relative to the actuator 14, since there is no radial stop on the actuator 14 to prevent its movement in all directions in contact with the radial flange 36 of this actuator 14, and more precisely in contact with the central zone 39 of this radial flange.

In practice, the omnidirectional capacity for movement of the bearing element 15 in contact with the actuator 14 is radially limited only by the edging 34 of the support plate forming the operating element 13.

This invention is not limited to the embodiment described and shown, but covers all possible alternative embodiments within the scope of the appended claims.

In particular, the axial wall of the actuator is not necessarily strictly tubular, but on the contrary it may instead be generally tubular, and for example, fragmented into two or more columns, in a circular configuration.

Moreover, the ball bearings constituting the bearing element are not necessarily standard bearings.

On the contrary, in a manner known per se, they may consist of special bearings the inner and outer rings of which have different axial lengths and/or are axially offset relative to each other.

In this case, the support plate forming the operating element and/or the flange of the actuator with which the bearing element cooperates may be planar, without any zones axially offset relative to one another.

Moreover, the assembly for guiding the actuator on its support guide is not necessarily a smooth mounting; on the contrary, it may, for example, be splined or otherwise grooved.

Finally, this invention is not limited to cases where the bearing element used is a ball bearing; the bearing element may instead consist, for example, of a graphite ring.

I claim:

1. A clutch release bearing assembly, comprising an operating element adapted to be acted upon by a control member such as a disengagement fork, an actuator comprising an axial extension, one end of said actuator under the effect of said operating element being adapted to act on the disengagement mechanism of a clutch, and a bearing element located axially between the operating element and a portion of the actuator axially remote from said one end, which bearing element is movable transversely in all directions relative to the operating element, the bearing element also being movable transversely in every direction relative to the actuator, wherein said operating element engages with a support member mounted for axial movement, said operating member being acted upon by the associated control member, and wherein swivel means are provided between said operating element and said support member.

2. A clutch release bearing assembly as claimed in claim 1, wherein the operating element comprises a support plate which extends transversely relative to the axis of the assembly, and said swivel means comprises a spherical cup formed in the central zone of said support plate, which abuts axially on a shoulder of complementary spherical contour provided on the support member.

3. A clutch release bearing assembly, comprising an operating element adapted to be acted upon by a control member such as a disengagement fork, an actuator comprising an axial extension having an end which, under the effect of said operating element is adapted to act on the disengagement mechanism of a clutch, and a bearing element located axially between the operating element and an end of the actuator axially remote from said one end, which bearing element is movable transversely in all directions relative to the operating element, the bearing element also being movable transversely in every direction relative to the actuator wherein the actuator is mounted for axial sliding movement over a support guide, and the actuator freely abuts axially on the bearing element.

4. A clutch release bearing assembly, comprising an operating element adapted to be acted upon by a control member such as a disengagement fork, an actuator comprising an extension-piece, which, under the effect of said operating element is adapted to act on the disengagement mechanism of a clutch, and a bearing element located between the operating element and the actuator, which bearing element is movable transversely in all directions relative to the operating element the bearing element also being movable transversely in every direction relative to the actuator, wherein the actuator is generally tubular and comprises an axial wall provided at each end thereof with a radial flange, one of said flanges cooperating with the bearing element and the other acting on the disengagement mechanism, at least one of said radial flanges forming a part which is separate from the associated axial wall and suitably mounted thereon.

5. A clutch release bearing assembly as claimed in claim 4, wherein for supporting the bearing element, the operating element comprises a peripheral zone, which is axially offset relative to a central zone and that of the radial flanges of the actuator which cooperates with the bearing element comprises, for cooperation therewith, a central zone axially offset relative to a peripheral zone, and the central zone of the operating element and the central zone of the radial flange are axially offset in the same direction.

6. A clutch release bearing comprising an operating element mounted for axial sliding movement on a support member, an axially elongate actuator mounted for axial sliding movement on a support guide and cooperable, approximate to one end, with clutch disengagement means, an antifriction bearing operatively disposed axially between said operating element and said actuator, said antifriction bearing having a race engageable with said actuator remote from said one end, means permitting limited transverse shifting movement of said antifriction bearing in all directions in a plane generally perpendicular to the axes of said control member and said support guide relative to said operating element and said actuator for self-centering said antifriction bearing in case of misalignment of the said axes.

7. A clutch release bearing according to claim 6, wherein swivel means are provided between said operating element and said control member permitting swivel movement of said operating element.

8. A clutch release bearing according to claim 7, wherein said operating element comprises a transversely extending support plate, said swivel means comprising a spherical cup arranged in the central part of said transverse support plate and a complementary spherical shoulder on said control member.

9. A clutch release bearing according to claim 6, wherein said actuator is of generally axially extending tubular configuration, a radial flange being provided at each end of said actuator, one of said flanges cooperating with said race of the antifriction bearing and said other flange cooperating with said clutch disengagement means.

10. A clutch release bearing according to claim 8, wherein said means permitting limited shifting movement of said antifriction bearing comprises spring biasing means urging said other race against said operating element.

11. A clutch release bearing comprising an operating element mounted for axial sliding movement with a control member, an actuator mounted for axial sliding movement on a support guide and cooperate with clutch disengagement means, an antifriction bearing operatively disposed between said operating element and said actuator, said antifriction bearing having one race engageable with said actuator, means axially attaching said antifriction bearing to said operating element and means biasing said other race against said operating element, said antifriction bearing being shiftable transversely in a plane generally perpendicular to the axes of the operating element and said actuator whereby in case of misalignment of said axes said antifriction bearing is automatically self-centered, said actuator being of generally axially extending tubular configuration, a radial flange at each end of said actuator, one of said flanges cooperating with said one race of said antifriction bearing and said other flange cooperating with said clutch disengagement means.

12. A clutch release bearing comprising an operating element mounted for axial sliding movement with a control member, an axially extending actuator mounted for axial sliding movement on a support guide and cooperable with clutch disengagement means, an antifriction bearing disposed axially between said operating element and said actuator, said antifriction bearing having one race engageable with an end of said actuator remote from said disengagement means and resilient biasing means urging the other race of said antifriction bearing against said operating element, said antifriction bearing being shiftable transversely in all directions in a plane generally perpendicular to the axes of the operating element and said actuator whereby in case of misalignment of said axes said antifriction bearing is automatically self-centered.

13. A clutch release bearing according to claim 12, wherein swivel means are provided between said operating element and said control member permitting swivel movement of said operating element.

14. A clutch release bearing according to claim 13, wherein said operating element comprises a transversely extending support plate, said swivel means comprising a spherical cup arranged in the central part of said transverse support plate and a complementary spherical shoulder on said control member.

15. A clutch release bearing according to claim 12, wherein said actuator is of generally axially extending tubular configuration, a radial flange being provided at each end of said actuator, one of said flanges cooperating with said one race of the antifriction bearing and said other flange cooperating with said clutch disengagement means.

* * * * *